No. 733,990. PATENTED JULY 21, 1903.
G. D. MUNSING.
CYCLE MOWER.
APPLICATION FILED JULY 11, 1902.
NO MODEL. 3 SHEETS—SHEET 1.

Attest:
Israel Crane
A. F. Heaton

Inventor
George D. Munsing, per
Thomas S. Crane, Atty.

No. 733,990. PATENTED JULY 21, 1903.
G. D. MUNSING.
CYCLE MOWER.
APPLICATION FILED JULY 11, 1902.
NO MODEL. 3 SHEETS—SHEET 2.
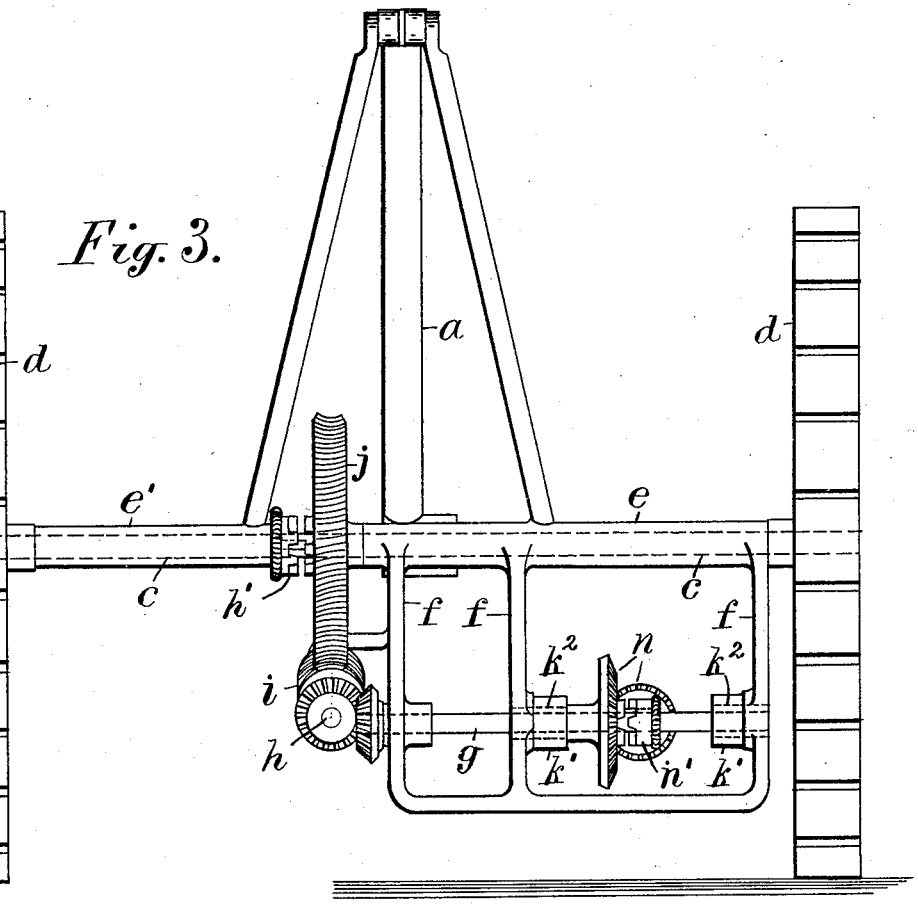

No. 733,990. PATENTED JULY 21, 1903.
G. D. MUNSING.
CYCLE MOWER.
APPLICATION FILED JULY 11, 1902.
NO MODEL. 3 SHEETS—SHEET 3.
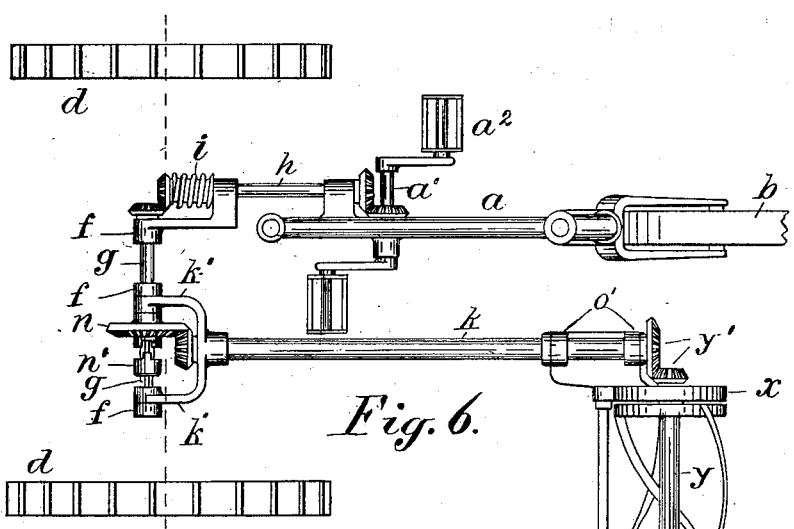
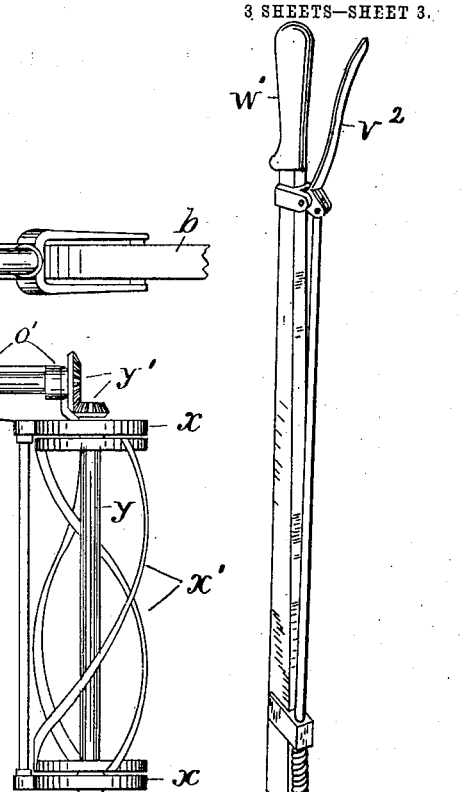
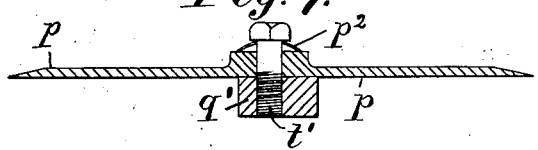
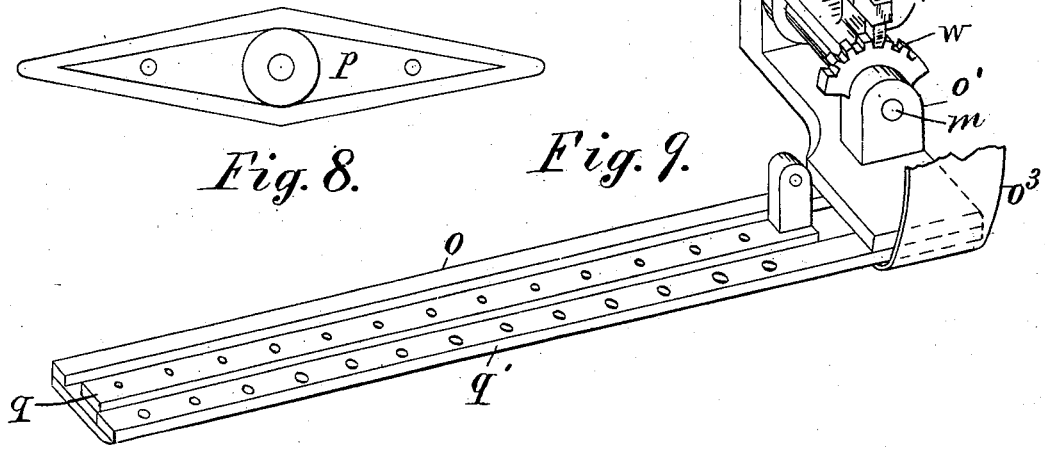
Attest:
L. Lee.
O. F. Heaton.
Inventor.
George D. Munsing, per
Thomas S. Crane, Atty.

No. 733,990. Patented July 21, 1903.

UNITED STATES PATENT OFFICE.

GEORGE D. MUNSING, OF NEW YORK, N. Y.

CYCLE-MOWER.

SPECIFICATION forming part of Letters Patent No. 733,990, dated July 21, 1903.

Application filed July 11, 1902. Serial No. 115,122. (No model.)

*To all whom it may concern:*

Be it known that I, GEORGE D. MUNSING, a citizen of the United States, residing at No. 3 West Eighth street, New York, county of New York, State of New York, have invented certain new and useful Improvements in Cycle-Mowers, fully described and represented in the following specification and the accompanying drawings, forming a part of the same.

The object of the present invention is to furnish a means by which a lawn-mower may be propelled and actuated by an operator riding upon the machine, and such object is attained by combining a lawn-mower with a cycle having a seat and pedals for an operator and means actuated by the pedals for propelling the cycle slowly and for driving the mowing-cutter rapidly. The cutter-carriage may be of any desired construction, as with rotary spiral cutters such as are used in hand-mowers or with a reciprocating cutter-bar such as is used in grass and grain cutters.

In connecting a lawn-mower with a cycle it is desirable to provide means for raising the cutters as they pass over inequalities or obstructions on the surface of the ground and for sustaining the cutters at various distances above the surface when operated, and it is also desirable to furnish a means of disconnecting the cutters at times from the cycle-pedals. The normal movement of the pedals necessarily propels the motor-wheels of the cycle at a very slow rate, so as not to advance over half an inch for each movement of the cutters, and the connection between the pedals and the motor-wheels thus prevents the movement of the machine at a more rapid rate when the machine is in transit from one place to another, and the present invention furnishes a means of disconnecting the motor-wheels from the pedals, so that the wheels may turn freely.

A construction is illustrated for carrying out the various objects referred to; but I do not limit myself to the particular construction described, as the following description will readily enable modifications to be made.

Figure 1:
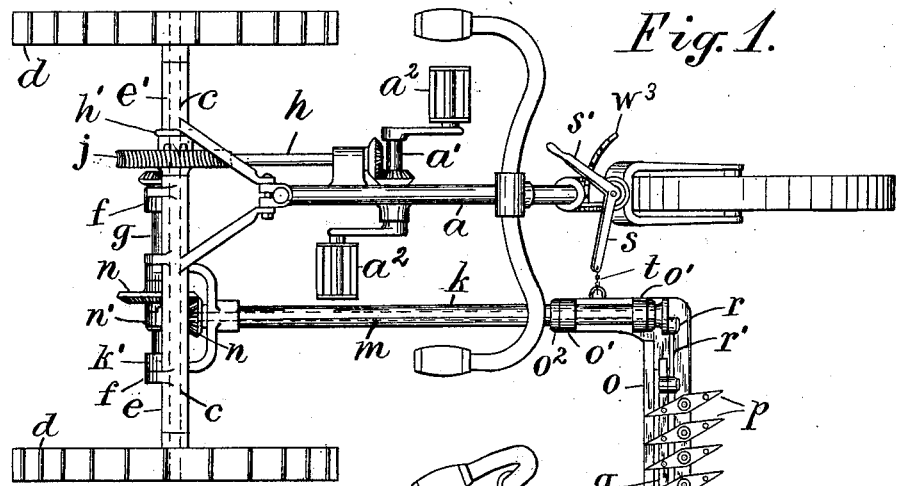
Figure 2:
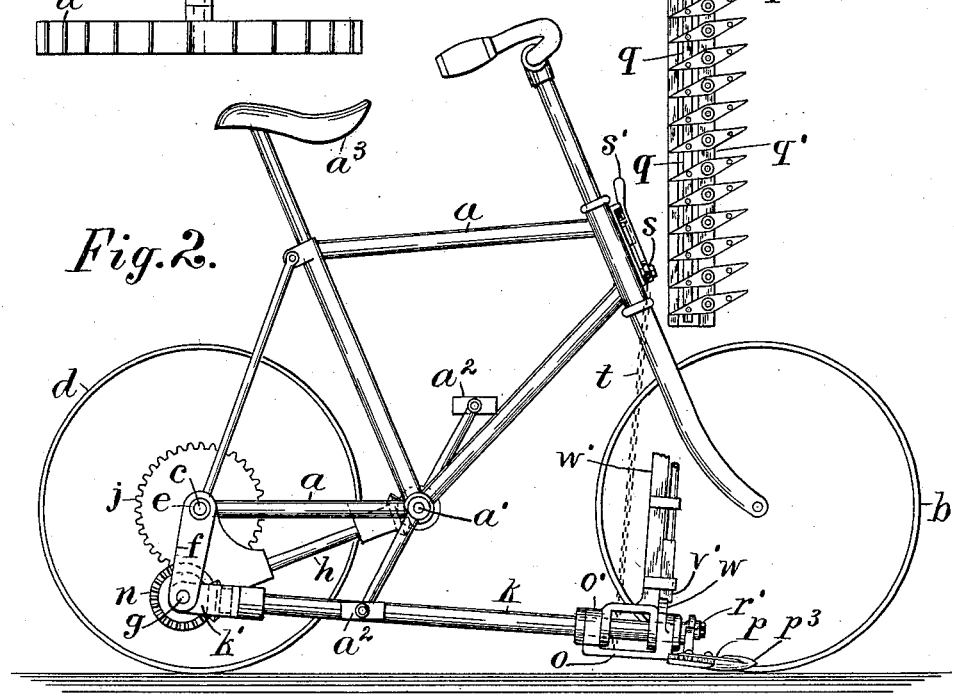
Figure 2A:
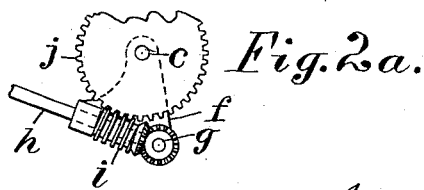

In the annexed drawings, Figure 1 is a plan of a tricycle provided with vibrating cutters. Fig. 2 is a side elevation of the same. Fig. 2ª is a side elevation of the worm and worm-wheel; Fig. 3, a rear elevation of the same, the seat being omitted from Figs. 1 and 3. Fig. 4 is a side elevation of the hinged connection of the cutter-carriage to the cutter-shaft arm. Fig. 5 is an end view of the cutter-shaft arm and the cutter-carriage. Fig. 6 is a plan of the cycle-frame and carriage with rotary cutters. Fig. 7 is a longitudinal section of one of the vibrating cutters with a cross-section of the fulcrum-bar $q'$. Fig. 8 is a plan of the cutter, and Fig. 9 is a perspective view of the cutter-carriage with the latch-lever for oscillating the same upon the cutter-shaft arm.

$a$ designates the frame of a tricycle having the usual form, with steering-wheel $b$ in the front, and a rear motor-axle $c$, having motor-wheels $d$ attached thereto. The cycle is provided with the usual crank-shaft $a'$, having cranks with pedals $a^2$ and with seat $a^3$ for the operator. The boxes $e$ and $e'$ of the rear axle are attached to the braces of the frame $a$ and support a hanger $f$, carrying a pivot-shaft $g$, which shaft is connected with the crank-shaft $a'$ by a driving-shaft $h$ with bevel-gears at both ends, Figs. 1, 2ª, and 6. The driving-shaft $h$ is inclined downwardly beneath the motor-axle $c$ to engage a worm $i$ upon such driving-shaft with a worm-wheel $j$ upon the motor-axle, thus propelling the motor-wheels $d$ at a rate much slower than the movements of the crank-shaft. A clutch $h'$ connects the worm-wheel $j$ detachably with the motor-shaft $c$, Fig. 3. A horizontal cutter-shaft arm $k$ is hinged by forked bearings $k'$ upon bushings $k^2$, secured in the hanger $f$ to form bearings for the pivot-shaft $g$. Such arm $k$ is shown formed with a long tube to inclose the cutter-shaft $m$, and such shaft is connected with the pivot-shaft $g$ by multiplying-gears $n$, one of them being fitted loosely to the pivot-shaft and connected thereto when in operation by clutch $n'$. The bars $o\ q'$, which carry the cutters, I have termed a "cutter-carriage," which is hinged by perforated lugs $o'$ upon the forward end of the tubular arm $k$ and held in place thereon by collars $o^2$. The cutter-carriage projects laterally from the arm and from the path of the cycle, and reversible or double-ended cutters $p$ are shown journaled by bolts $t'$, Fig. 7, upon the fulcrum-bar $q'$ of the cutter-carriage, and each is pivotally connected (by a pivot $p'$ through the cutter) with a cutter-bar $q$. The usual slotted fingers $p^3$ (shown in Figs. 2 and 4) are provided to embrace the cutter-points when cutting, but are omitted from Fig. 1 to show the cutters fully. The fingers form a shearing-bed for the cutters, which are pressed elastically toward the same by a spring-washer $p^2$ under the head of the bolt $t'$, Fig. 7.

The upper surfaces of the bars $o$ and $q'$ are flush with one another, and they are connected together at both ends so as to hold them rigidly parallel, leaving a space between them for the cutter-bar $q$.

The shearing-bed in each finger is also flush with the said bars. If the cutters were held solely by their journal upon the fulcrum-bar $q'$, they would be capable of springing upwardly in the fingers; but the contact of their rear ends with the rear bar $o$ holds the front ends downward upon the fingers and secures a more perfect operation of the cutting-blade. The bar $o$ lies below the rear ends of the cutters, and thus braces the rear ends of the cutters against the upward thrust upon their forward ends.

The cutter-bar is reciprocated by a crank $r$ upon the cutter-shaft $m$ and a pitman $r'$. As the cutter-carriage is hinged upon the axis of the cutter-shaft, the carriage may be tipped at any angle upon the arm $k$ without deranging the operation of the pitman, and the cutters are thus adapted to operate upon terraces and slopes at various angles to the path of the cycle. The arm $k$ being pivoted upon the pivot-shaft $g$ can also be adjusted at any angle to the horizontal without deranging the gearing $n$ of the cutter-shaft.

A bell-crank is pivoted upon the front of the cycle-frame, with an arm $s$ connected by chain $t$ to the forward end of the cutter-shaft arm $k$, so as to raise and lower such arm at pleasure, and the bell-crank has an arm $s'$ fitted elastically to notches in a segment $w^3$, fixed concentric with the pivot of the bell-crank to hold the bell-crank and the cutter-shaft arm in position when adjusted, Figs. 1 and 2. The inclination of the cutter-carriage may be varied by a latch-lever $w'$, which is pivoted upon the cutter-shaft arm $k$ between the lugs $o'$ of the cutter-carriage and has a spring-latch $v'$ fitted to a toothed segment $w$, attached rigidly to one of the lugs $o'$. The latch $v'$ is provided, as usual, with a latch-handle $v^2$ adjacent to the handle of the latch-lever, so that the operator while sitting upon the seat $a^3$ can readily detach the latch from the segment $w$ and engage it with any of the notches in the segment to permit the operator to tilt the carriage in the required degree.

When the carriage is resting normally upon level ground, the latch-lever would be engaged with a notch to hold it in an upright position, as shown in Fig. 8; but when the operator requires to tilt the carriage the latch would be disengaged and the lever inclined outwardly over the carriage to engage the required notch, so that an inward movement of the lever may be effected through the required arc.

By the use of the latch-lever the cutter-carriage may be raised to clear stones, stakes, or flower-beds in the path of the mower, and the cutter-carriage may also be set to mow the side of an upwardly or downwardly inclined terrace.

Fig. 6 shows the frame and gearing of the machine which are shown in Fig. 1 with a carriage for spiral cutters. Such a carriage is shown provided at the ends with the usual circular heads $x$ to carry a longitudinal shaft $y$, connected with the cutter-shaft $m$ by bevel-gears $y'$. The shaft $y$ is shown with the usual spiral cutters $x'$, which would operate with a fixed blade adjacent to the ground, as in a manner well known. The carriage for the spiral cutters is shown hinged upon the cutter-shaft arm $k$ by the lugs $o'$, the same as the cutter-carriage shown in Fig. 1, and one of such lugs could, if desired, be provided with the notched segment, so that the carriage could be elevated or placed in different positions in relation to the arm $k$ by means of a latch-lever, as already described.

From the above description it will be seen that the nature of the cutters is immaterial to the practice of my invention and that the invention may be embodied in any cycle-mower having a seat and pedals for an operator and means actuated by the pedals for propelling the cycle slowly and for driving the mowing-cutters rapidly. Such diversity of speed may be effected by any suitable gearing, the worm-wheel $j$ serving as a convenient means of turning the motor-shaft $c$ much slower than the crank-shaft $a'$, while the proportions of the gears which connect the driving-shaft $h$ with the pivot-shaft $g$ and which connect the pivot-shaft with the cutter-shaft $m$ are adapted to drive the cutter at the rapid speed desired. Any suitable form of gearing may be used to attain these results.

The cycle-mower may be constructed and sold cheaply and greatly increases the capacity of an operator to mow the grass of a lawn, as his force may be far more effectively exerted through his feet by means of the pedals than when merely walking over the ground to push a rotary mower.

The swath cut by a hand-propelled mower is necessarily limited to about eighteen inches by the excessive resistance which it causes to the advance of the operator; but with the gearing embodied in the cycle-mower a much wider swath may be cut and the lawn may be trimmed more smoothly with much less fatigue.

The cutters $p$ are made with similar tapering points and double cutting edges at opposite sides of the center bolt-hole and are made reversible by forming pivot-holes $p'$ directly in the cutter-blade equidistant from the center in both the tapering ends. The cutters are made by drop-forging, with a central boss for the bolt $t'$, and are pivoted upon the front edge of the cutter-carriage on the bar $q'$, and the cutter-bar $q$ is reciprocated under their rear ends, so that either end of the cutter may be pivotally connected to such cutter-bar. When the cutters become dull, they may be readily reversed, and the machine thus used twice as long before it requires repairs.

It will be observed by reference to Fig. 6 that the crank-shaft $a'$, the pivot-shaft $g$, and the rotary mower-shaft $y$ are all parallel, which would permit them to be connected by sprocket wheels and chains, if desired, and it is therefore immaterial whether the shaft $a'$ be connected with the shaft $g$ by chains or by bevel-gearing and whether the shaft $g$ be connected to the shaft $y$ by chains or bevel-gearing.

Having thus set forth the nature of the invention, what is claimed herein is—

1. A cycle-mower having a reciprocating cutter-bar, a seat and pedals for an operator, and a driving crank-shaft actuated by the pedals, a rear axle with the wheels $d$ attached thereto, a frame carrying the parts and having boxes forming a support for such rear axle with hangers projected downward rigidly from such axle-support, a pivot-shaft journaled in the hangers, a horizontal arm hinged to oscillate about the axis of the pivot-shaft, a cutter-shaft journaled in said horizontal arm, the cutter-carriage pivoted upon the forward end of the horizontal arm, and gearing connecting the pivot-shaft respectively with the cutter-shaft and with the driving crank-shaft, substantially as herein set forth.

2. A cycle-mower having a reciprocating cutter-bar, a seat and pedals for an operator, and a driving crank-shaft actuated by the pedals, a rear axle $c$ with the wheels $d$ attached thereto, a frame carrying the parts and having boxes forming a support for such rear axle with hangers projected downward rigidly from such axle-support, a pivot-shaft journaled in the hangers, a horizontal arm hinged to oscillate about the pivot-shaft, a cutter-shaft journaled in such horizontal arm, the cutter-carriage pivoted upon the forward end of the horizontal arm, gearing connecting the pivot-shaft respectively with the cutter-shaft and with the driving crank-shaft, and a cutter-carriage hinged upon the cutter-shaft with connection from such cutter-shaft to the cutters to operate the same, substantially as herein set forth.

3. A cycle-mower having a reciprocating cutter-bar, a seat and pedals for an operator, and a driving crank-shaft actuated by the pedals, a rear axle with the wheels $d$ attached thereto, a frame carrying the parts and having boxes forming a support for such rear axle with hangers projected downward rigidly from such axle-support, a worm-wheel mounted upon the rear axle between the boxes, a shaft and worm connecting such worm-wheel with the pedals, a pivot-shaft journaled in the hangers, a horizontal arm hinged to oscillate about the pivot-shaft, a cutter-shaft journaled in such horizontal arm, a cutter-carriage hinged upon the cutter-shaft, and suitable toothed wheels to form with the parts named two trains of gearing connecting the pivot-shaft respectively with the cutters and with the pedals, substantially as herein set forth.

4. A cycle-mower having a reciprocating cutter-bar, a seat and pedals for an operator, and a driving crank-shaft actuated by the pedals, a rear axle with driving-wheels thereon, a frame carrying the parts and having boxes forming a support for such rear axle with hangers projected downward rigidly from such axle-support, a worm-wheel mounted upon the rear axle between the boxes, a shaft and worm connecting such worm-wheel with the pedals, a pivot-shaft journaled in the hangers, a horizontal arm hinged to oscillate about the pivot-shaft, a cutter-shaft journaled in such horizontal arm, a cutter-carriage hinged to oscillate about the cutter-shaft, a train of gearing including a clutch for connecting the cutter-shaft detachably to the pivot-shaft, and a train of gearing connecting the pivot-shaft to the driving crank-shaft, as and for the purpose set forth.

5. A cycle-mower having a reciprocating cutter-bar, a seat and pedals for an operator, and a driving crank-shaft actuated by the pedals, a rear axle with the driving-wheels attached thereto, a frame carrying the parts and having boxes forming a support for such rear axle with hangers projected downward rigidly from such axle-support, a pivot-shaft journaled in the hangers, a horizontal arm hinged to oscillate about the axis of the pivot-shaft, a cutter-shaft journaled in such horizontal arm, and the cutter-carriage hinged to oscillate about the axis of the cutter-shaft and provided with the hinge-lugs $o'$, the fulcrum-bar $q'$, and the bar $o$ arranged in the rear of the same to admit the cutter-bar $q$ between the said bars $o$ and $q'$, substantially as herein set forth.

In testimony whereof I have hereunto set my hand in the presence of two subscribing witnesses.

GEORGE D. MUNSING.

Witnesses:
L. LEE,
A. F. HEATON.